(12) United States Patent
Adachi (10) Patent No.: US 8,639,860 B2
(45) Date of Patent: Jan. 28, 2014

(54) DATA TRANSFER SYSTEM AND DATA TRANSFER METHOD

(75) Inventor: Masaharu Adachi, Ikeda (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 13/417,659

(22) Filed: Mar. 12, 2012

(65) Prior Publication Data

US 2012/0271973 A1  Oct. 25, 2012

(30) Foreign Application Priority Data

Mar. 14, 2011  (JP) ................................. 2011-055651

(51) Int. Cl.
*G06F 13/28*  (2006.01)
*G06F 15/167*  (2006.01)

(52) U.S. Cl.
USPC ................ 710/22; 710/23; 710/24; 710/25; 710/26; 710/27; 710/28; 709/212; 711/100

(58) Field of Classification Search
None
See application file for complete search history.

(56) References Cited

U.S. PATENT DOCUMENTS

| | | | | |
|---|---|---|---|---|
| 4,400,772 A | * | 8/1983 | Broyles et al. | 710/22 |
| 4,989,113 A | * | 1/1991 | Asal | 710/22 |
| 5,099,417 A | * | 3/1992 | Magar et al. | 710/27 |
| 5,199,105 A | * | 3/1993 | Michael | 710/22 |
| 5,228,130 A | * | 7/1993 | Michael | 710/8 |
| 5,325,489 A | * | 6/1994 | Mitsuhira et al. | 710/22 |
| 5,561,816 A | * | 10/1996 | Mitsuhira et al. | 710/22 |
| 5,613,162 A | * | 3/1997 | Kabenjian | 710/22 |
| 5,754,884 A | * | 5/1998 | Swanstrom | 710/22 |
| 5,822,568 A | * | 10/1998 | Swanstrom | 703/24 |
| 5,887,134 A | * | 3/1999 | Ebrahim | 709/200 |
| 5,937,206 A | * | 8/1999 | Nakamura | 710/22 |
| 6,055,583 A | * | 4/2000 | Robbins | 710/22 |
| 6,154,793 A | * | 11/2000 | MacKenna et al. | 710/23 |
| 7,073,007 B1 | * | 7/2006 | Kumar | 710/268 |
| 7,165,126 B2 | * | 1/2007 | Fukawa et al. | 710/22 |
| 7,555,625 B2 | * | 6/2009 | Nam | 711/165 |
| 7,624,324 B2 | * | 11/2009 | Hanaoka et al. | 714/746 |
| 7,752,469 B2 | | 7/2010 | Adachi | |
| 7,881,063 B2 | | 2/2011 | Adachi | |

(Continued)

FOREIGN PATENT DOCUMENTS

| | | |
|---|---|---|
| JP | 2-252044 | 10/1990 |
| JP | 2723970 | 11/1997 |
| JP | 2004-206241 | 7/2004 |
| JP | 2006-228194 | 8/2006 |

OTHER PUBLICATIONS

"Direct Memory Access Transfer Control Technique", by Krosschell, KD, Moertl, DF, IBM, Jun. 1, 1990.*

(Continued)

*Primary Examiner* — Henry Tsai
*Assistant Examiner* — Jing-Yih Shyu
(74) *Attorney, Agent, or Firm* — Cooper & Dunham LLP (57) ABSTRACT

A data transfer system includes: a processor; a main memory that is connected to the processor; a peripheral controller that is connected to the processor; and a peripheral device that is connected to the peripheral controller and includes a register set, wherein the peripheral device transfers data stored in the register set to a predetermined memory region of the main memory or the processor by a DMA (Direct Memory Access) transfer, and the processor reads out the data transferred to the memory region by the DMA transfer without accessing to the peripheral device.

8 Claims, 8 Drawing Sheets

(56) References Cited

U.S. PATENT DOCUMENTS

| | | | |
|---|---|---|---|
| 7,904,638 B2 | 3/2011 | Adachi | |
| 8,010,730 B2 | 8/2011 | Adachi | |
| 8,176,221 B2* | 5/2012 | Nagai et al. | 710/22 |
| 2004/0193755 A1* | 9/2004 | Safranek et al. | 710/22 |
| 2004/0243739 A1* | 12/2004 | Spencer | 710/22 |
| 2005/0188119 A1* | 8/2005 | Hayden | 710/22 |
| 2007/0030515 A1 | 2/2007 | Adachi | |
| 2007/0206019 A1 | 9/2007 | Adachi | |
| 2008/0040518 A1* | 2/2008 | Yoon | 710/23 |
| 2008/0162737 A1* | 7/2008 | Liu et al. | 710/8 |
| 2008/0257955 A1 | 10/2008 | Adachi | |
| 2009/0074387 A1 | 3/2009 | Adachi | |
| 2009/0100238 A1 | 4/2009 | Adachi | |
| 2009/0240885 A1 | 9/2009 | Adachi | |
| 2010/0017544 A1* | 1/2010 | Chun et al. | 710/22 |
| 2011/0022740 A1* | 1/2011 | Yoon | 710/23 |

OTHER PUBLICATIONS

"A Method for Direct Memory Access (DMA)", IP.com, Aug. 30, 2005.*

"Interfacing of Slow Direct Memory Access and Peripheral Devices to a High Speed Bus", Davis, GT, IBM, Oct. 1, 1984.*

"High Performance DMA", by Tago, K, IBM, Nov. 1, 1993.*

* cited by examiner

CONVENTIONAL TECHNIQUE

PRIOR ART

FIG. 11

PRIOR ART

FIG. 12

PRIOR ART

FIG. 13

PRIOR ART

DATA TRANSFER SYSTEM AND DATA TRANSFER METHOD

CROSS-REFERENCE TO RELATED APPLICATIONS

The present application is based on and claims priority from Japanese patent application number 2011-055651, filed Mar. 14, 2011, the disclosure of which is hereby incorporated by reference herein in its entirety.

BACKGROUND

The present invention relates to a data transfer system and a data transfer method.

Figure 10:
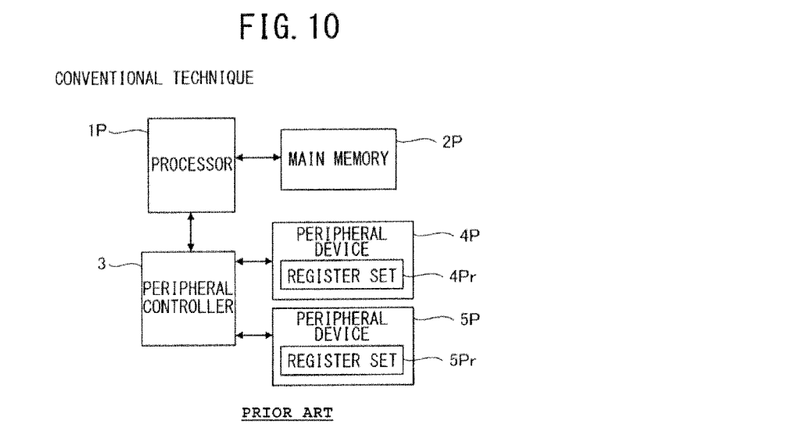
FIG. 10 is a block diagram illustrating a constitution of a data transfer system according to conventional technique.

FIG. 10 is a block diagram illustrating a constitution of a data transfer system according to a conventional technique. The data transfer system in FIG. 10 includes a processor 1P that is, for example, a CPU (Central Processing Unit), a main memory 2P that is connected to the processor 1P, a peripheral controller 3 such as a north bridge or the like connected to the processor 1P, and peripheral devices 4P and 5P such as an expansion board and the like connected to the peripheral controller 3. In addition, the peripheral device 4P includes a register set 4Pr that stores data necessary for operations of the peripheral device 4P such as a flag that indicates a state of the peripheral device 4P, an address of a data transfer destination, an address of a data transfer source, interrupt status data that indicate an interrupt factor, and the like. Similar to the peripheral device 4P the peripheral device 5P also includes a register set SPr.

Figure 11:
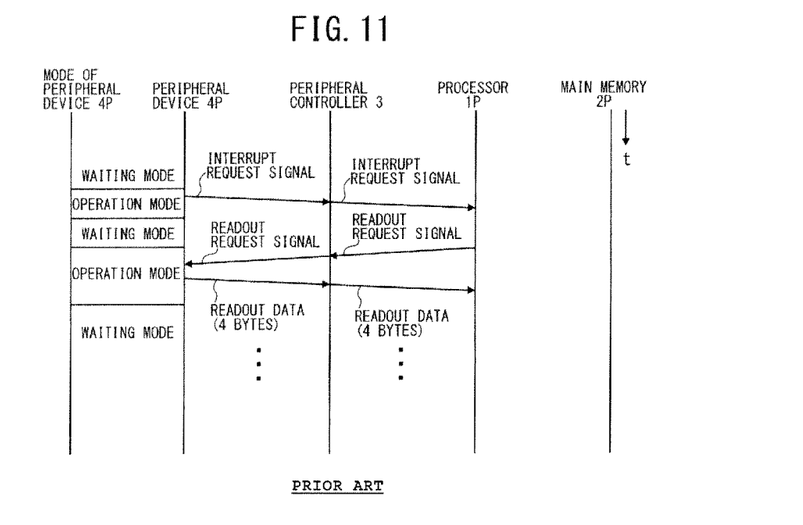
FIG. 11 is a sequence diagram illustrating a first operation example of the data transfer system in FIG. 10.

FIG. 11 is a sequence diagram illustrating a first operation example of the data transfer system in FIG. 10. In FIG. 11, when an interrupt factor occurs in the peripheral device 4P, the peripheral device 4P changes a mode from a waiting mode to an operation mode, stores interrupt status data that indicates an interrupt factor in the register set 4Pr, and sends an interrupt request signal that requests the execution of an interrupt operation to the peripheral controller 3. And then, the peripheral device 4P changes the mode to the waiting mode. In response to the interrupt request signal, the peripheral controller 3 transfers the received interrupt request signal to the processor 1P. Additionally, in response to the interrupt request signal, by executing the interrupt operation, the processor 1P sends a readout request signal that requests the reading out of the interrupt status data from the register set 4Pr to the peripheral controller 3.

Upon receipt of the readout request signal from the processor 1P, the peripheral controller 3 controls the peripheral device 4P to change the mode to the operation mode, and transfers the received readout request signal to the peripheral device 4P. In response to the readout request signal, the peripheral device 4P the mode of which has been changed to the operational mode, reads out data in the register set 4Pr and sends it as readout data to the peripheral controller 3, and changes the mode to the waiting mode. The peripheral controller 3 transfers the received readout data to the processor 1P. And then the processor 1P determines the interrupt factor based on the received readout data.

Generally, in the data transfer system according to the conventional technique in FIG. 10, the data transfer speed between the peripheral controller 3 and the peripheral device 4P is approximately 1/100 of the data transfer speed between the processor 1P and the main memory 2P, and extremely slow. In addition, in the sequence diagram in FIG. 11, a size of data when the peripheral controller 3 receives the readout data from the peripheral device 4P depends on a memory size of the peripheral device 4P, and is 4 bytes, for example. Therefore, in order to transfer the readout data of 256 bytes from the peripheral device 4P to the processor 1P via the peripheral controller 3, between the peripheral device 4P and the peripheral controller 3, and between the peripheral controller 3 and the processor 1P, it is necessary to execute the data transfer 64 times each. At this time, in the peripheral device 4P, every time 4-byte readout data is sent, since switching of the mode between the waiting mode and the operation mode is performed, there is a problem of an increase of power consumption. (For example, see Japanese Patent Application Publication Number 2006-228194, Japanese Patent Application Publication Number 2004-206241, and Japanese Patent Number 2723970)

SUMMARY

An object of the present invention is to solve the above-described problem, and to provide a data transfer system and a data transfer method that reduce an access time from a processor to peripheral devices and the number of accesses, and power consumption.

In order to achieve the above object, an embodiment of the present invention provides a data transfer system comprising: a processor; a main memory that is connected to the processor; a peripheral controller that is connected to the processor; and a peripheral device that is connected to the peripheral controller and includes a register set, wherein the peripheral device transfers data stored in the register set to a predetermined memory region of the main memory or the processor by a DMA (Direct Memory Access) transfer, and the processor reads out the data transferred to the memory region by the DMA transfer without accessing to the peripheral device.

In order to achieve the above object, an embodiment of the present invention provides a data transfer method for a data transfer system including a processor, a main memory that is connected to the processor; a peripheral controller that is connected to the processor; and a peripheral device that is connected to the peripheral controller and includes a register set, the method comprising: a step of transferring data stored in the register set to a predetermined memory region of the main memory or the processor by a DMA (Direct Memory Access) transfer; and a step of reading out the data transferred to the memory region by the DMA transfer without accessing to the peripheral device.

DETAILED DESCRIPTION OF THE PREFERRED EMBODIMENTS

Hereinafter, embodiments according to the present invention will be explained with reference to the drawings. In each of the following embodiments, similar constituents are denoted by the same reference signs.

First Embodiment

Figure 1:
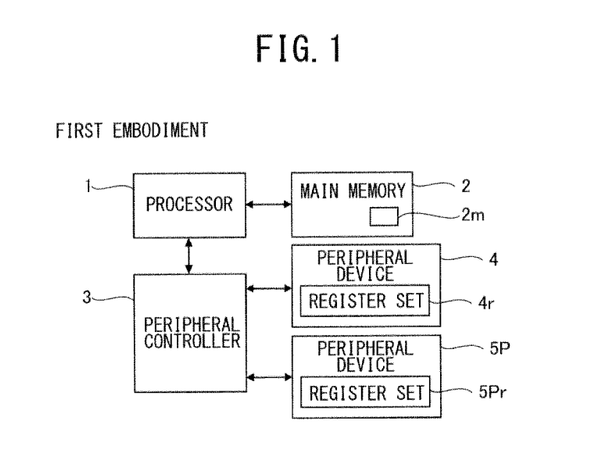
FIG. 1 is a block diagram illustrating a constitution of a data transfer system according to a first embodiment of the present invention.

FIG. 1 is a block diagram illustrating a constitution of a data transfer system according to a first embodiment of the present invention. The data transfer system in FIG. 1 includes a processor 1 that is, for example, a CPU, a main memory 2 connected to the processor 1, a peripheral controller 3 connected to the processor such as a north bridge, or the like, peripheral devices 4 and 5P connected to the peripheral controller 3 such as an expansion board and the like. In addition, the peripheral device 5P includes a register set 5Pr that stores data necessary for operations of the peripheral device 5P such as a flag that indicates a state of the peripheral device 5P, an address of a data transfer destination, an address of a data transfer source, interrupt status data that indicate an interrupt factor, and the like.

As described in detail later, a feature of the data transfer system according to the present invention is as follows. The peripheral device 4 transfers data stored in the register set 4r to a predetermined memory region 2m of the main memory 2 by a DMA (Direct Memory Access) transfer, and the processor 1 reads out the data transferred to the memory region 2m by the DMA transfer without accessing to the peripheral device 4. And after storing transfer notification data Dt for notifying that the DMA transfer has been performed in the register set 4r, the peripheral device 4 transfers data stored in the register set 4r and including the transfer notification data Dt to the memory region 2m by the DMA transfer, and the processor 1 reads out the transfer notification data Dt transferred to the memory region 2 by the DMA transfer, and based on the read out transfer notification data Dt, determines whether the peripheral device 4 has performed the DMA transfer or not. When it is determined that the peripheral device 4 has not performed the DMA transfer, the processor 1 does not read out other data transferred to the memory region 2m by the DMA transfer. In addition, when reading out the data transferred to the memory region 2m by the DMA transfer ends, the processor 1 performs control to reset the transfer notification data Dt stored in the memory region 2m, and sends an end notification signal that notifies the above end, and the peripheral device 4, in response to the end notification signal, resets the transfer notification data Dt stored in the register set 4r.

Figure 2:
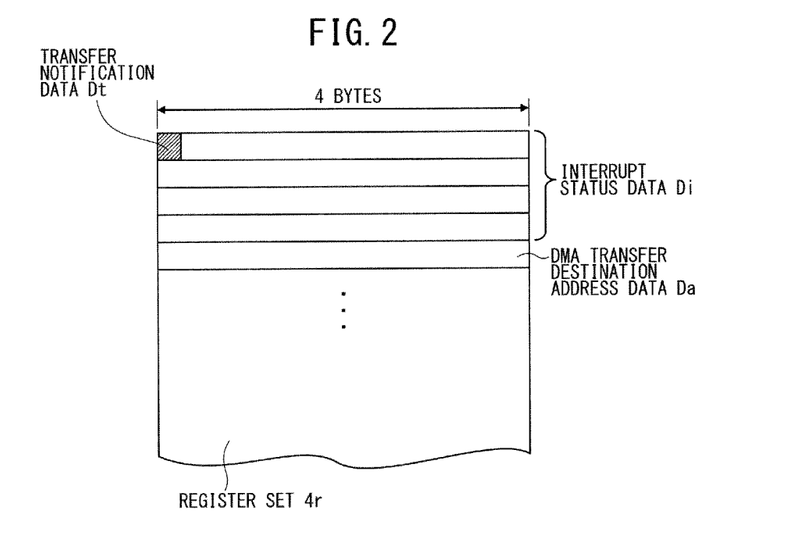
FIG. 2 is a block diagram illustrating a constitution of a register set 4r in FIG. 1.

In FIG. 1, the peripheral device 4 includes the register set 4r, and has a function of transferring data stored in the register set 4r to the predetermined memory region 2m of the main memory 2 via the peripheral controller 3 and the processor 1 by the DMA transfer. FIG. 2 is a block diagram illustrating a constitution of the register set 4r in FIG. 1. In FIG. 2, the register set 4r temporarily stores data necessary for operations of the peripheral device 4 including transfer notification data Dt for notifying that the data stored in the register 4r has been transferred to the memory region 2m, interrupt status data Di indicating an interrupt factor that has occurred in the peripheral device 4, and DMA transfer destination address data Da that is an address of the memory region 2m. The transfer notification data Dt is stored at the forefront of the register set 4. The DMA transfer destination address data Da is set beforehand when starting up the data transfer system, and stored in the register set 4.

First Operation Example

Figure 3:
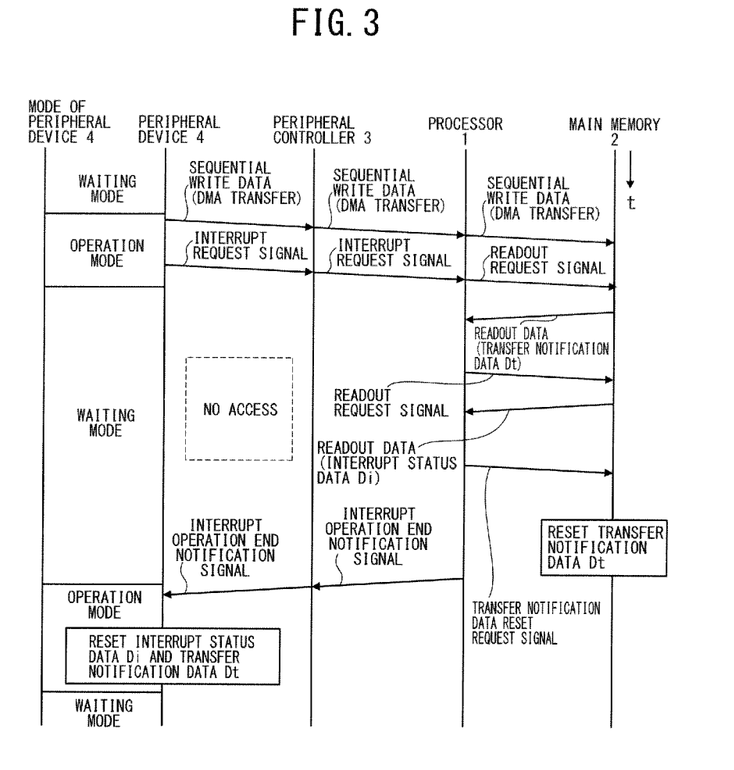
FIG. 3 is a sequence diagram illustrating a first operation example of the data transfer system in FIG. 1.

FIG. 3 is a sequence diagram illustrating a first operation example of the data transfer system in FIG. 1. In the present operation example, predetermined interrupt numbers that are different from each other are allotted to the peripheral device 4 and the peripheral devices 5P. In FIG. 3, in the peripheral device 4, when an interrupt factor such as update of data in the register set 4r or the like occurs, the peripheral device 4 changes the mode from the waiting mode to the operation mode, and stores the transfer notification data Dt that notifies that the data stored in the register set 4r has been transferred to the memory region 2m, and the interrupt status data Di that indicates the occurred interrupt factor. And the peripheral device 4 transfers the data in the register set 4r as sequential write data to the memory region 2m via the peripheral controller 3 and the processor 1 by the DMA transfer. Next, the peripheral device 4 sends an interrupt request signal that requests the execution of an interrupt operation to the peripheral controller 3. Here, the interrupt request signal includes an interrupt number allotted beforehand to the peripheral device 4. And the peripheral device 4 changes the mode to the waiting mode. In addition, the peripheral controller 3, in response to the interrupt request signal, transfers the received interrupt request signal to the processor 1.

Additionally, in FIG. 3, by executing the interrupt operation in response to the interrupt request signal, based on the interrupt number included in the interrupt request signal, the processor 1 recognizes that the peripheral device 4 generates the interrupt request signal, and sends a readout request signal that requests the reading out of the transfer notification data Dt transferred by the DMA transfer to the memory region 2m to the main memory 2. In response to this, the main memory 2 reads out the transfer notification data Dt transferred to the memory region 2m, and sends it as readout data to the processor 1. The processor 1, based on the transfer notification data Dt included in the readout data read out from the memory region 2m, recognizes that the peripheral device 4 transfers the data in the register set 4r to the main memory 2 by the DMA transfer before outputting the interrupt request signal. In addition, the processor 1 sends a readout request signal that requests the reading out of the interrupt status data Di transferred to the memory 2m to the main memory 2. In response to this, the main memory 2 reads out the interrupt status data Di transferred to the memory region 2m and sends it as readout data to the processor 1. The processor 1 recognizes an interrupt factor that has occurred in the peripheral device 4 based on the interrupt status data included in the readout data read out from the memory region 2m.

Next, in FIG. 3, the processor 1 sends a transfer notification data reset request signal that requests the resetting of the transfer notification data Dt in the memory region 2m to the main memory 2. In response to this, the main memory 2 resets the transfer notification data Dt stored in the memory region 2m. In addition, the processor 1 sends an interrupt operation end notification signal that notifies that the interrupt operation ends to the peripheral controller 3. In response to this, the peripheral controller 3 controls the peripheral device 4 to change the mode to the operation mode and transfers the received interrupt operation end notification signal to the peripheral device 4. In response to the interrupt operation end notification signal, the peripheral device 4 resets the interrupt status data Di and the transfer notification data Dt in the register set 4r.

According to the operation example in FIG. 3, before sending the interrupt request signal to the processor 1, the peripheral device 4 transfers data in the register set 4r to the main memory 2 via the peripheral controller 3 and the processor 1 by the DMA transfer. And in response to the interrupt request signal, the processor 1 reads out data not in the register set 4r of the peripheral device 4 but the transferred data in the register set 4r from the main memory 2. At this time, since a transferable data size by the DMA transfer for one time (for example, 256 bytes) is much larger than a data size when the peripheral controller 3 reads out data from the peripheral device 4 (for example, 4 bytes), and the data transfer speed between the processor 1 and the main memory 2 is faster than the data transfer speed between the peripheral device 4 and the peripheral controller 3, it is possible for the processor 1 to read out the transferred data in the register set 4r from the main memory 2 in a short time compared to the conventional technique (see FIG. 11). Additionally, since the mode of the peripheral device 4 remains in the waiting mode until receiving the interrupt operation end notification signal after sending the interrupt request signal, it is possible to lengthen the duration of the waiting mode compared to the conventional technique and reduce power consumption.

In addition, the processor 1 needs to reset the interrupt factor, after executing the interrupt operation in response to the received interrupt request signal, by performing write access to the register set 4r of the peripheral device 4 of a transfer source of the interrupt request signal and resetting the interrupt status data Di and the transfer notification data Dt. According to the operation example in FIG. 3, since the peripheral device 4 resets the transfer notification data Dt in addition to the interrupt status data Di in response to the interrupt operation end notification signal, the processor 1 does not need to perform write access to the peripheral device 4 again in order to reset the transfer notification data Dt, after accessing to the peripheral device 4 in order to reset the interrupt status data Di. Therefore, it is possible to reduce the number of accesses to the peripheral device 4, and lower a frequency of use and/or a consumption amount of an available bus bandwidth and power consumption by the peripheral device 4.

In FIG. 3, the data in the register set 4r is transferred by the DMA transfer as sequential write data to the memory region 2m via the peripheral controller 3 and the processor 1; however, the embodiment of the present invention is not limited thereto. A part of the data such as the data changed from the data transferred by the DMA transfer last time of the data in the register set 4r can be transferred by the DMA transfer as the sequential write data to the memory region 2m via the peripheral controller 3 and the processor 1. Additionally, in FIG. 3, the peripheral device 4 resets the transfer notification data Dt in response to the interrupt operation end notification signal; however, the embodiment of the present invention is not limited thereto, and can reset the transfer notification data Dt in response to the readout request signal.

Second Operation Example

Figure 4:
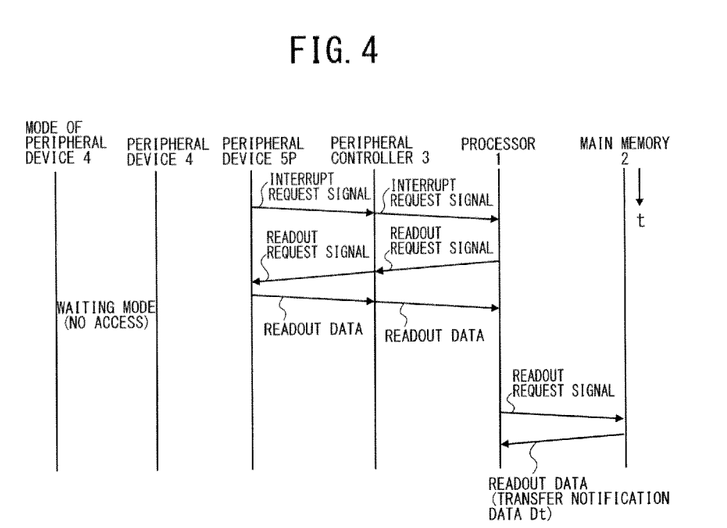
FIG. 4 is a sequence diagram illustrating a second operation example of the data transfer system in FIG. 1.

FIG. 4 is a sequence diagram illustrating a second operation example of the data transfer system in FIG. 1. With reference to FIG. 4, a second operation example of the data transfer system in FIG. 1 will be explained when a common interrupt number is allotted to the peripheral device 4 and the peripheral device 5P, and the peripheral device 5P generates an interrupt request signal.

Figure 12:
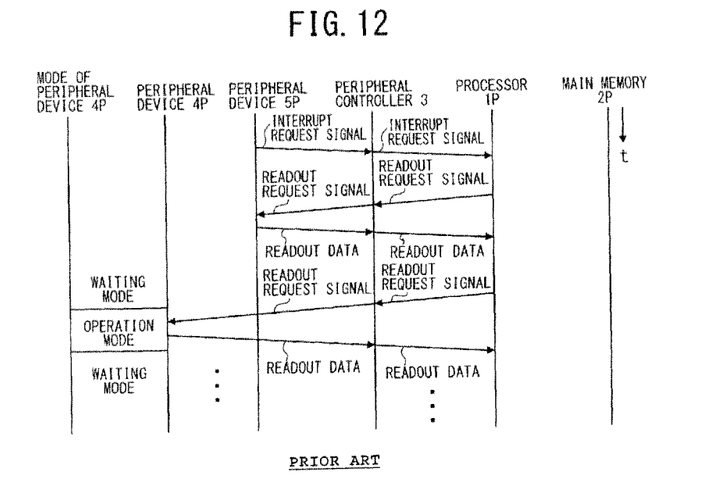
FIG. 12 is a sequence diagram illustrating a second operation example of the data transfer system in FIG. 10.

Firstly, with reference to FIG. 12, a second operation example of a data transfer system according to the conventional technique in FIG. 10 will be explained when a common interrupt number is allotted to the peripheral device 4P and the peripheral device 5P, and the peripheral device 5P generates an interrupt request signal. In FIG. 12, when an interrupt factor occurs in the peripheral device 5P, the peripheral device 5P stores interrupt status data that indicates the interrupt factor in the register set 5Pr, and sends an interrupt request signal that requests the execution of an interrupt operation to the peripheral controller 3. At this time, the interrupt request signal includes the interrupt number commonly allotted to the peripheral device 4P and peripheral device 5P. In response to the interrupt request signal, the peripheral controller 3 transfers the received interrupt request signal to a processor 1P. In addition, the processor 1P, based on the interrupt number included in the interrupt request signal, recognizes that at least one of the peripheral devices 4P and 5P generates the interrupt request signal. And, by executing the interrupt operation, the processor 1P sends a readout request signal that requests the reading out of interrupt status data from the register set 5Pr to the peripheral device 5P via the peripheral controller 3. In response to the readout request signal, the peripheral device 5P reads out data in the register set 5Pr, and sends it as readout data to the processor 1P via the peripheral controller 3. And the processor 1P, based on the received readout data, determines whether the peripheral device 5P generates the interrupt request signal or not, and determines an interrupt factor in a case of generating the interrupt request signal.

In addition, in FIG. 12, by executing the interrupt operation, the processor 1P sends a readout request signal that requests the reading out of interrupt status data from a register set 4Pr to the peripheral controller 3. When receiving the readout request signal from the processor 1P, the peripheral controller 3 controls the peripheral device 4P to change the mode to the operation mode, and transfers the received readout request signal to the peripheral device 4P. The peripheral device 4P the mode of which has been changed to the operation mode, in response to the readout request signal, reads out data in the register set 4Pr, sends it as readout data to the peripheral controller 3, and changes the mode to the waiting mode. The peripheral controller 3 transfers the received readout data to the processor 1P. And the processor 1P, based on the received readout data, determines that the peripheral device 4P has not sent the interrupt request signal, and ends the interrupt operation. Therefore, in the data transfer system in FIG. 10 according to the conventional technique, when the peripheral device 4P and the peripheral device 5P share the interrupt number, in a case where only the peripheral device 5P outputs the interrupt request signal, even though the peripheral device 4P does not output the interrupt request signal, the peripheral device 4P changes the mode from the waiting mode to the operation mode, which leads to an increase of power consumption.

Next, with reference to FIG. 4, in the data transfer system according to the present embodiment, when the peripheral device 4 and the peripheral device 5P share an interrupt number, an operation will be explained in a case where only the peripheral device 5P outputs an interrupt request signal. In FIG. 4, when an interrupt factor occurs in the peripheral device 5P, the peripheral device 5P stores interrupt status data that indicates the interrupt factor in the register set 5Pr, and sends an interrupt request signal that requests the execution of an interrupt operation to the peripheral controller 3. At this time, the interrupt request signal includes an interrupt number that is allotted commonly to the peripheral device 4 and the peripheral device 5P. In response to the interrupt request signal, the peripheral controller 3 transfers the received interrupt request signal to the processor 1. And the processor 1, based on the interrupt number included in the interrupt request signal, recognizes that at least one of the peripheral devices 4 and 5P generates the interrupt request signal. And then, the processor 1, by executing an interrupt operation, sends a readout request signal that requests the reading out of the interrupt status data from the register set 5Pr to the peripheral device 5P via the peripheral controller 3. The peripheral device 5P, in response to the readout request signal, reads out data in the register set 5Pr, and sends it as readout data to the processor 1 via the peripheral controller 3. And the processor 1 determines whether the peripheral device 5P generates the interrupt request signal or not, and determines an interrupt factor in a case of generating the interrupt request signal.

Additionally, in FIG. 4, the processor 1 sends a readout request signal that requests the reading out of transfer notification data Dt in the register set 4r transferred to the memory region 2m to the main memory 2. In response to this, the main memory 2 reads out the transfer notification data Dt transferred to the memory region 2m, and sends it to the processor 1. The processor 1, based on the transfer notification data Dt read out from the memory region 2m, determines whether the peripheral device 4 outputs the interrupt request signal or not. In the example in FIG. 4, since the peripheral device 4 does not output the interrupt request signal, and the transfer notification data Dt is reset, the processor 1 ends the interrupt operation.

Therefore. according to the present embodiment, when receiving the interrupt request signal including the interrupt number allotted to the peripheral device 4, the processor 1 reads Out not the data in the register set 4r of the peripheral device 4 but the data in the register set 4r transferred to the memory region 2m of the main memory 2. And it is possible for the peripheral device 4 to maintain the waiting mode. Accordingly, when the interrupt request signal is outputted from the peripheral device 5P that shares the interrupt number with the peripheral device 4, and the peripheral device 4 does not output the interrupt request signal, the peripheral device 4 does not change the mode to the operation mode from the waiting mode. Compared to the conventional technique, it is possible to lengthen a duration that the peripheral device 4 maintains the waiting mode, and lower power consumption.

Additionally, the peripheral device 4, at the forefront of the register set 4r, stores the transfer notification data Dt that notifies that the data stored in the register set 4r has been transferred to the memory region 2m by the DMA transfer, and performs the DMA transfer to transfer sequential write data including the transfer notification data Dt (see FIG. 3) before outputting the interrupt request signal to the processor 1. Furthermore, the processor 1 resets the transfer notification data Dt in the memory region 2m when the interrupt operation ends. Therefore, the processor 1, by only reading out the transfer notification data Dt from the memory region 2m, determines whether the peripheral device 4 outputs the interrupt request signal or not. Accordingly, it is possible to reduce the number of accesses to the peripheral device 4 from the processor 1, and reduce a frequency of use and/ or a consumption amount of an available memory bandwidth and power consumption of the peripheral device 4.

Third Operation Example

Figure 5:
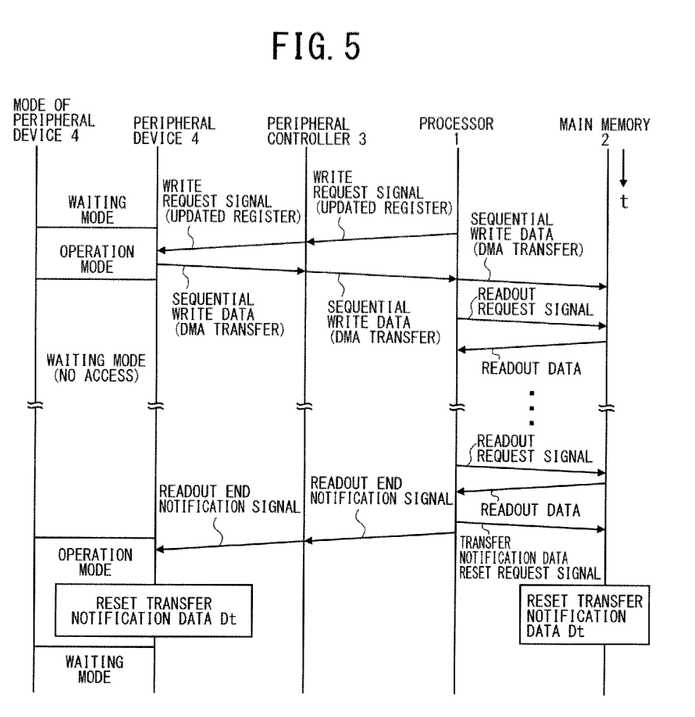
FIG. 5 is a sequence diagram illustrating a third operation example of the data transfer system in FIG. 1.

FIG. 5 is a sequence diagram illustrating a third operation example of the data transfer system in FIG. 1. With reference to FIG. 5, the third operation example of the data transfer system in FIG. 1 will be explained when the processor 1 reads out all data in the register set 4r.

Figure 13:
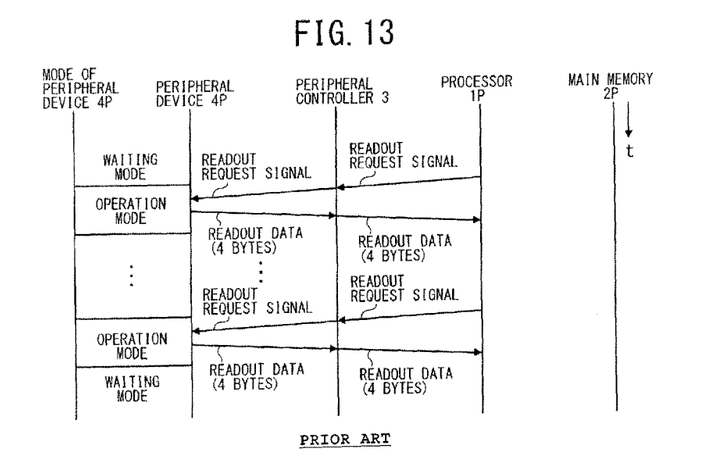
FIG. 13 is a sequence diagram illustrating a third operation example of the data transfer system in FIG. 10.

Firstly, with reference to FIG. 13, a third operation example of the data transfer system according to the conventional technique in FIG. 10 will be explained when the processor 1P reads out all data in the register set 4Pr. In FIG. 13, the processor 1P sends a readout request signal that requests the reading out of data in the register set 4Pr to the peripheral controller 3. When receiving the readout request signal from the processor 1P, the peripheral controller 3 controls the peripheral device 4P to change the mode to the operation mode, and transfers the received readout request signal to the peripheral device 4P. In response to the readout request signal, the peripheral device 4P the mode of which has been changed to the operation mode reads out the data in the register set 4Pr, sends it as readout data to the peripheral controller 3, and changes the mode to the waiting mode. And the peripheral controller 3 transfers the received readout data to the processor 1P. At this time, a size of the readout data depends on a memory size of the peripheral controller 3, and is 4 bytes, for example. Therefore, when a size of the data in the register set 4Pr is, for example, 256 bytes, between the processor 1P and the peripheral device 4P, the readout data needs to be transferred 64 times via the peripheral controller 3. Additionally, at every transfer, the peripheral device 4P changes the mode from the waiting mode to the operation mode, which leads to an increase of power consumption.

Next, with reference to FIG. 5, the third operation example of the data transfer system in FIG. 1 will be explained when the processor 1 reads out all data in the register set 4r, In FIG. 5, the processor 1 sends a write request signal that requests the transfer of all data in the register set 4r by the DMA transfer to the memory region 2m to the peripheral controller 3. In response to this, the peripheral controller 3 controls the peripheral device 4 to change the mode to the operation mode, and transfers the received write request signal to the peripheral device 4. The peripheral device 4 the mode of which has been changed to the operation mode, in response to the write request signal, transfers all data in the register set 4r as sequential write data by the DMA transfer to the memory region 2m of the main memory 2 via the peripheral controller 3 and the processor 1. And the peripheral device 4 changes the mode from the operation-mode operation mode to the waiting mode.

In addition, in FIG. 5, the processor 1 sends a readout request signal that requests the reading out of data transferred in the memory region 2m to the main memory 2. In response to this, the main memory 2 reads out the data transferred in the memory region 2m, and sends it as readout data to the processor 1. The processor 1 and the main memory 2 repeat sending and receiving the readout request signal and the readout data, until all data transferred in the memory region 2m is read out. And when ending readout of all data transferred in the memory region 2m, the processor 1 sends a transfer notification data reset request signal that requests the resetting of the transfer notification data Dt in the memory region 2m to the main memory 2. In response to this, the main memory 2 resets the transfer notification data Dt sent in the memory region 2m. Furthermore, the processor 1 sends a readout end notification signal that notifies the end of the data readout from the memory region 2m to the peripheral controller 3. In response to this, the peripheral controller 3 controls the peripheral device 4 to change the mode to the operation mode, and transfers the received readout end notification signal to the peripheral device 4. In response to the readout end notification signal, the peripheral device 4 resets the transfer notification data Dt in the register set 4r. Therefore, the peripheral device 4, based on the transfer notification data Dt in the register set 4r, recognizes the end of the data readout from the memory region 2m by the processor 1.

According to the operation example in FIG. 5, after transferring all data in the register set 4r by the DMA transfer, the peripheral device 4 changes the mode from the operation mode to the waiting mode. Additionally, the processor 1 reads out the transferred data in the register set 4r of the peripheral device 4, by accessing to the main memory 2, without accessing to the register set 4r of the peripheral device 4. Therefore, compared to the conventional technique, it is possible to reduce power consumption and a frequency of use and/or a consumption amount of an available bus bandwidth. Additionally, after transferring the data in the register set 4r by the DMA transfer from the peripheral device 4 to the main memory 2, the processor 1 reads out the transferred data in the register set 4r from the main memory 2; therefore it is possible for the processor 1 to read out the data in the register set 4r in a short time compared to the conventional technique.

In FIG. 5, the peripheral device 4 transfers all data in the register set 4r to the main memory 2 by the DMA transfer; however the embodiment of the present invention is not limited thereto, and only data in an updated register after a previous DMA transfer of the data in the register set 4r can be transferred to the main memory 2 by the DMA transfer.

Second Embodiment

Figure 6:
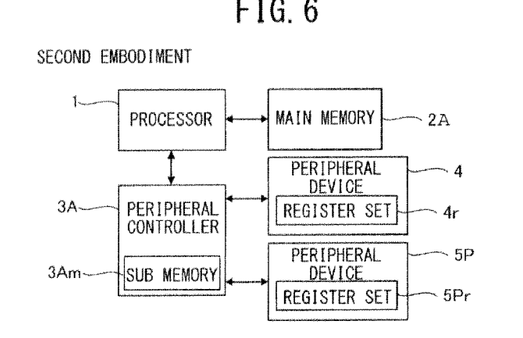
FIG. 6 is a block diagram illustrating a constitution of a data transfer system according to a second embodiment of the present invention.
Figure 7:
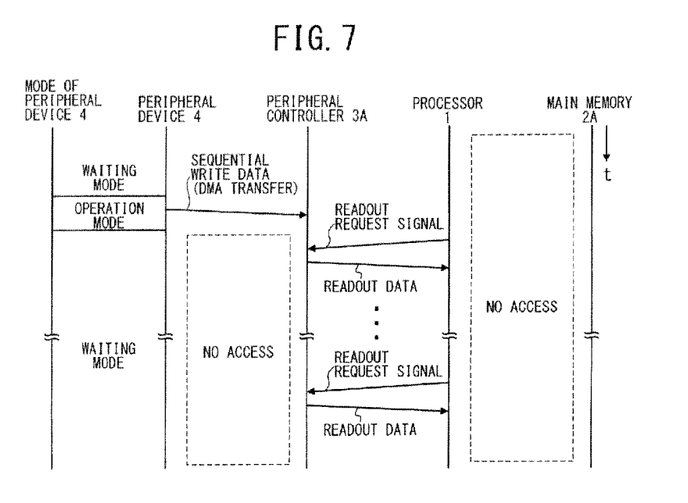
FIG. 7 is a sequence diagram illustrating an operation example of the data transfer system in FIG. 6.

FIG. 6 is a block diagram illustrating a constitution of a data transfer system according to a second embodiment of the present invention. FIG. 7 is a sequence diagram illustrating an operation example of the data transfer system in FIG. 6. In FIG. 6, the data transfer system according to the present embodiment is different from the data transfer system according to the first embodiment of the present invention in that the data transfer system according to the present embodiment includes a main memory 2A in place of the main memory 2 and a peripheral controller 3A in place of the peripheral controller 3. Here, compared to the main memory 2, the main memory 2A does not include a memory region 2m that stores data in the register set 4r. Additionally, compared to the peripheral controller 3, the peripheral controller 3A includes a sub memory 3Am that stores data in the register set 4r. And in the present embodiment, the DMA transfer destination address data Da in the register set 4r (see FIG. 2) is address data of the sub memory 3Am.

In FIG. 7, in predetermined conditions such as when an interrupt factor such as update of the data in the register set 4r or the like occurs as illustrated in FIG. 3, when receiving a write request signal from the processor 1 via the peripheral controller 3A as illustrated in FIG. 5 and the like, the peripheral device 4 changes the mode from the waiting mode to the operation mode, and transfers the data in the register set 4r to the sub memory 3Am in the peripheral controller 3A by the DMA transfer. And the peripheral device 4 changes the mode from the operation mode to the waiting mode. Additionally, the processor 1 sends a readout request signal that requests the reading out of the data in the register set 4r transferred to the sub memory 3Am by the DMA transfer to the peripheral controller 3A. In response to this, the peripheral controller 3A reads out the data stored in the sub memory 3Am and sends it as readout data to the processor 1. The peripheral controller 3A and the processor 1 repeat sending and receiving of the readout request signal and the readout data until readout of all data stored in the sub memory 3Am ends.

Accordingly, in the present embodiment, it is possible for the processor 1 to read out the data in the register set 4r transferred to the sub memory 3Am, without readout access to the peripheral device 4 and the main memory 2A. And since the peripheral device 4 does not have to perform a change of the mode from the waiting mode to the operation mode by readout of data in a register set and maintains the waiting mode, compared to the conventional technique, it is possible to reduce power consumption and the frequency of use and/or the consumption amount of the available bus bandwidth. In addition, the processor 1 does not access to the main memory 2A, and therefore when the processor 1 executes an operation where a load of the main memory 2A is large. the speed of the operation is not lowered. Furthermore, it is possible to lower the consumption amount of a memory bandwidth of the main memory 2A.

In the present embodiment, the sub memory 3Am is provided in the peripheral controller 3A; however the present embodiment is not limited thereto, and the sub memory 3Am can be provided in the processor 1 or in another device.

Third Embodiment

Figure 8:
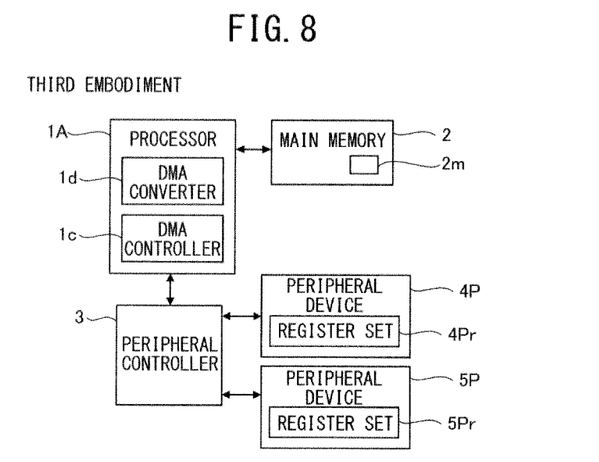
FIG. 8 is a block diagram illustrating a constitution of a data transfer system according to a third embodiment of the present invention.
Figure 9:
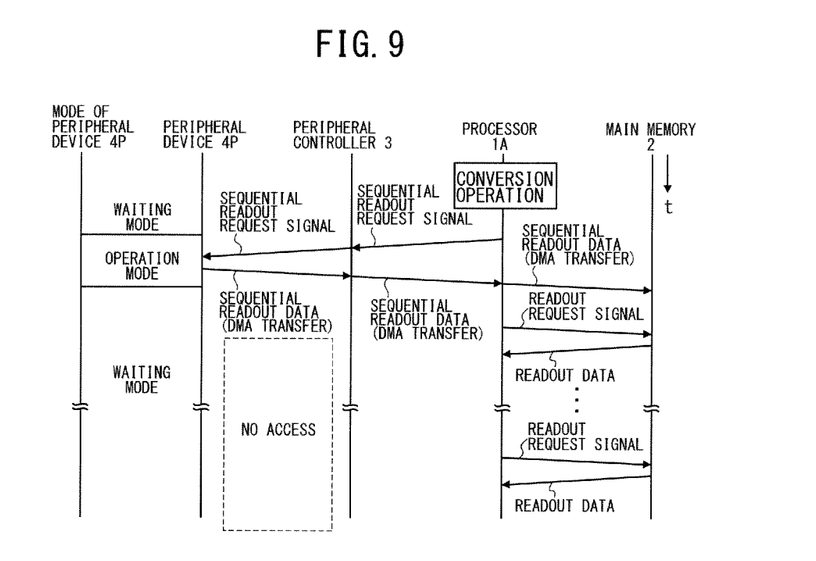
FIG. 9 is a sequence diagram illustrating an operation example of the data transfer system in FIG. 8.

FIG. 8 is a block diagram illustrating a constitution of a data transfer system according to a third embodiment of the present invention. FIG. 9 is a sequence diagram illustrating an operation example of the data transfer system in FIG. 8. The data transfer system according to the present embodiment is different from the data transfer system according to the first embodiment in that the data transfer system according to the present embodiment includes a processor 1A in place of the processor 1. and a peripheral device 4P in FIG. 10 in place of the peripheral device 4. Here, the processor 1A includes a DMA controller lc, and a DMA converter 1d that converts an instruction group for data transfer by a combination of a repeat prefix (REP) compliant with x86 of Intel (registered trademark) Corporation, and a string instruction such as a move string instruction (MOVSB) for 1-byte data transfer or the like into one instruction code for the DMA transfer.

In a case of the data transfer system according to the conventional technique in FIG. 10, when reading out 256-byte data in the register set 4P of the peripheral device 4P and transferring it to the main memory 2P, the processor 1P executes the following three instruction codes.

CLD
MOV CX, 100h
REP MOVSB

Here, "CLD" is a clear direction flag instruction that sets a direction flag DF to 1, which expresses incrementing an address. "MOV CX, 100h" is a move instruction that sets data of a counter register CX, which is the number of repetitions of data transfer, to 100h (h denotes a hexadecimal number). "REP MOVSB" is a data transfer instruction that repeatedly executes a move string byte instruction (MOVSB) that transfers one-byte data stored in an address [DS: S1] of the register 4Pr to an address [ES: D1] of the main memory 2P only the number of times of a value stored in the counter register CX. By sequentially executing these instruction codes, 256-byte data after an address [DS: D1] in the register set 4r of the peripheral device 4P is transferred to the main memory 2P by 1 byte via the peripheral controller 3. Therefore, access to the peripheral device 4P occurs 256 times.

On the other hand, in the data transfer system in FIG. 8, the DMA converter 1d converts an instruction code group for data transfer that repeatedly executes a string instruction such as a move string instruction (MOVSB) or the like. For example, the above-described instruction code group is converted into the following one instruction code by the DMA converter 1d.

DMA 100h

Here, in the above instruction code, 100h, an operand of a DMA transfer instruction "DMA" is a size of data that is transferred by the DMA transfer. The DMA controller 1c outputs a DMA transfer instruction after conversion to the peripheral device 4P via the peripheral controller 3. In response to this, the peripheral device 4P transfers the 256-byte data after the address [DS: D1] in the register set 4Pr of the peripheral device 4P to the memory region 2m of the main memory 2 by one-time DMA transfer via the peripheral controller 3.

In FIG. 9, the DMA converter 1d of the processor 1A converts an instruction code group including a data transfer instruction by a combination of a repeat prefix (REP) and a string instruction into one instruction code for the DMA transfer (hereinafter, referred to as DMA transfer instruction code), and outputs it to the DMA controller 1c. In response to this, the DMA controller 1c outputs a sequential readout request signal including the DMA transfer instruction cede after conversion to the peripheral controller 3. In response to the sequential readout request signal, the peripheral controller 3 controls the peripheral device 4P so as to change the mode to the operation mode, and transfers the sequential readout request signal to the peripheral device 4P. The peripheral device 4P the mode of which has been changed to the operation mode, in response to the sequential readout request signal, transfers data in the register set 4Pr as sequential write data to the memory region 2m of the main memory 2 via the peripheral controller 3 by a DMA sequential transfer. And the peripheral device 4P changes the mode to the waiting mode. Additionally, in FIG. 9, the processor 1A, similar to the processor 1 according to the first embodiment, reads out the data in the register set 4Pr from the memory region 2m of the main memory 2, without accessing to the peripheral device 4P.

Therefore, according to the present embodiment, in a case of transferring the data in the register set 4Pr to the main memory 2, it is possible to lower the number of readout accesses to the peripheral device 4P compared to the conventional technique. Therefore, it is possible to reduce the number of times of changing the mode of the peripheral device 4P from the waiting mode to the operation mode, and reduce power consumption and a consumption amount of a bus bandwidth. Additionally, if the DMA sequential transfer is used, it is possible to transfer all data from the peripheral device 4P to the main memory 2 by the DMA transfer with a fewer number of accesses.

In a case of the data transfer system according to the first embodiment and the second embodiment, the peripheral device 4 needs an additional device and a drive software to transfer the data in the register set 4r to the main memory 2 at a predetermined timing by the DMA transfer. However, according to the present embodiment, since the processor 1A sends the DMA transfer instruction to the peripheral device 4P, it is possible to transfer the data in the register set 4Pr from the peripheral device 4P according to the conventional technique to the main memory 2 without such an additional device and a drive software.

In the present embodiment, the DMA converter 1d is provided in the processor 1A; however the embodiment of the present invention is not limited thereto, and can be provided in the peripheral controller 3 or another device.

According to the embodiments of the present invention, a peripheral device transfers data stored in a register set to a predetermined memory region of a main memory or a processor by a DMA transfer, and since the processor reads out the data transferred by the DMA transfer to the main memory without accessing to the peripheral device, compared to the conventional technique, it is possible to reduce an access time and the number of accesses from the processor to the peripheral device, and lower power consumption.

Although the present invention has been described in terms of exemplary embodiments, it is not limited thereto. It should be appreciated that variations may be made in the embodiments described by persons skilled in the art without departing from the scope of the present invention as defined by the following the claims.

What is claimed is:

1. A data transfer system comprising:
a processor;
a main memory that is connected to the processor;
a peripheral controller that is connected to the processor; and
a peripheral device that is connected to the peripheral controller and includes a register set,
wherein, in a case in which an interrupt factor occurs in the peripheral device, the peripheral device transfers data stored in the register set to a predetermined memory region of the main memory or the processor by a DMA (Direct Memory Access) transfer, and the processor reads out the data transferred by the DMA transfer to the memory region without accessing the peripheral device in response to an interrupt request signal from the peripheral device requesting execution of a predetermined interrupt operation,
wherein after storing transfer notification data that notifies the DMA transfer has been performed in the register set, the peripheral device transfers data stored in the register set and including the transfer notification data to the memory region by the DMA transfer, and the processor reads out the transfer notification data transferred to the memory region by the DMA transfer, determines whether the peripheral device has performed the DMA transfer or not, based on the read out transfer notification data, and does not read out other data transferred to the memory region by the DMA transfer, when the peripheral device has not performed the DMA transfer, and
wherein when reading out the data transferred to the memory region by the DMA transfer ends, the processor performs control to reset the transfer notification data stored in the memory region, and sends an end notification signal that notifies the end to the peripheral device, and in response to the end notification signal, the peripheral device resets the transfer notification data stored in the register set.

2. The data transfer system according to claim 1, wherein before sending the interrupt request signal that requests execution of a predetermined interrupt operation to the processor, the peripheral device transfers the data stored in the register set to the memory region by the DMA transfer.

3. The data transfer system according to claim 1, wherein when data in the register set has been changed, the peripheral device transfers the changed data to the memory region by the DMA transfer.

4. The data transfer system according to claim 1, wherein by converting an instruction code group for repeatedly executing a string instruction for transferring data per predetermined transfer unit to one instruction code for transferring the data by the DMA transfer, and executing the instruction code, the processor controls the peripheral device to transfer the data stored in the register set to the memory region by the DMA transfer.

5. A data transfer method for a data transfer system including a processor; a main memory that is connected to the processor; a peripheral controller that is connected to the processor; and a peripheral device that is connected to the peripheral controller and includes a register set, the method comprising:

a step of transferring data, in a case in which an interrupt factor occurs in the peripheral device, stored in the register set to a predetermined memory region of the main memory or the processor by a DMA (Direct Memory Access) transfer; and a step of reading out the data transferred by the DMA transfer to the memory region without accessing the peripheral device in response to an interrupt request signal from the peripheral device requesting execution of a predetermined interrupt operation, wherein the step of transferring includes after storing transfer notification data that notifies the DMA transfer has been performed in the register set, a step of transferring data stored in the register set and including the transfer notification data to the memory region by the DMA transfer, the method further comprising:

a step of reading out the transfer notification data transferred to the memory region by the DMA transfer, determining whether the peripheral device has performed the DMA transfer or not, based on the read out transfer notification data, and not reading out other data transferred to the memory region by the DMA transfer, when the DMA transfer has not been performed;

a step of controlling the transfer notification data stored in the memory region and sending an end notification signal that notifies the end to the peripheral device, when reading out the data transferred to the memory region by the DMA transfer ends; and a step of resetting the transfer notification data stored in the register set in response to the end notification signal.

6. The data transfer method according to claim 5, further comprising:

a step of transferring the data stored in the register set to the memory region by the DMA transfer, before sending the interrupt request signal that requests execution of a predetermined interrupt operation to the processor.

7. The data transfer method according to claim 5, further comprising: when data in the register set is changed, a step of transferring the changed data to the memory region by the DMA transfer.

8. The data transfer method according to claim 5, further comprising: by converting an instruction code group for repeatedly executing a string instruction for transferring data per predetermined transfer unit to one instruction code for transferring the data by the DMA transfer, and executing the instruction code, a step of controlling the peripheral device to transfer the data stored in the register set to the memory region by the DMA transfer.

\* \* \* \* \*